United States Patent
Bull et al.

(10) Patent No.: US 8,612,963 B2
(45) Date of Patent: Dec. 17, 2013

(54) GUIDED PROBLEM RESOLUTION IN DEPLOYING AN APPLICATION

(75) Inventors: Brendan C. Bull, Durham, NC (US); David Contreras, Apex, NC (US); Robert C. Sizemore, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 12/958,558

(22) Filed: Dec. 2, 2010

(65) Prior Publication Data

US 2012/0144248 A1 Jun. 7, 2012

(51) Int. Cl.
*G06F 9/44* (2006.01)
*G06F 9/445* (2006.01)

(52) U.S. Cl.
USPC .................. 717/168; 717/175; 717/177

(58) Field of Classification Search
None
See application file for complete search history.

(56) References Cited

U.S. PATENT DOCUMENTS

| | | | | |
|---|---|---|---|---|
| 5,835,777 A * | 11/1998 | Staelin | ............ | 717/175 |
| 5,950,010 A * | 9/1999 | Hesse et al. | ............ | 717/178 |
| 6,675,382 B1 * | 1/2004 | Foster | ............ | 717/177 |
| 7,069,553 B2 * | 6/2006 | Narayanaswamy et al. | ... | 717/173 |
| 7,346,904 B2 * | 3/2008 | Fisher et al. | ............ | 717/177 |
| 7,412,700 B2 * | 8/2008 | Lari et al. | ............ | 717/175 |
| 7,458,073 B1 * | 11/2008 | Darling et al. | ............ | 717/168 |
| 7,735,057 B2 * | 6/2010 | Rachman et al. | ............ | 717/100 |
| 7,827,549 B2 * | 11/2010 | Tarassov | ............ | 717/174 |
| 8,074,217 B2 * | 12/2011 | James et al. | ............ | 717/175 |
| 8,352,935 B2 * | 1/2013 | Isaacson et al. | ............ | 717/173 |
| 8,418,165 B2 * | 4/2013 | Hoff et al. | ............ | 717/168 |
| 8,490,084 B1 * | 7/2013 | Alford et al. | ............ | 717/177 |
| 2004/0261060 A1 * | 12/2004 | Haselden et al. | ............ | 717/175 |
| 2005/0055692 A1 * | 3/2005 | Lupini et al. | ............ | 717/174 |
| 2005/0132357 A1 * | 6/2005 | Shell et al. | ............ | 717/168 |
| 2005/0172284 A1 * | 8/2005 | Dandekar et al. | ............ | 717/175 |
| 2005/0240921 A1 * | 10/2005 | Barker et al. | ............ | 717/177 |
| 2006/0123414 A1 * | 6/2006 | Fors et al. | ............ | 717/177 |
| 2006/0265702 A1 * | 11/2006 | Isaacson et al. | ............ | 717/168 |
| 2007/0271552 A1 * | 11/2007 | Pulley | ............ | 717/120 |
| 2008/0127171 A1 * | 5/2008 | Tarassov | ............ | 717/174 |
| 2008/0201701 A1 * | 8/2008 | Hofhansl et al. | ............ | 717/168 |
| 2008/0263511 A1 * | 10/2008 | Shapiro | ............ | 717/175 |
| 2011/0296398 A1 * | 12/2011 | Vidal et al. | ............ | 717/171 |
| 2012/0096451 A1 * | 4/2012 | Tenbarge et al. | ............ | 717/170 |

OTHER PUBLICATIONS

Wise Package Studio Reference, 2008 Symantec Corporation [Online], [Retrieved from the Internet on Jan. 17, 2013], <http://www.symantec.com/business/support/resources/sites/BUSINESS/content/live/DOCUMENTATION/1000/DOC1603/en_US/Wise%20Package%20Studio%207.0%20SP3%20Reference_V1.0.pdf>, pp. 1-34, 145-157, and 248-270.*

(Continued)

*Primary Examiner* — Thuy Dao
*Assistant Examiner* — Ravi K Sinha
(74) *Attorney, Agent, or Firm* — Patterson & Sheridan LLP (57) ABSTRACT

Techniques are disclosed for deploying an application. In one embodiment, a packaging tool determines that an error exists in a packaged application. The packaging tool may guide a user in fixing the error by updating the packaging tool and repackaging the application using the updated packaging tool. The packaging tool may guide the user via one or more notifications output for display to the user.

20 Claims, 4 Drawing Sheets

(56) References Cited

OTHER PUBLICATIONS

Jukka Kouletsis, The Basics of Application Packaging, Dell Power Solutions Nov. 2005 [Online], [Retrieved from the Internet on Jan. 8, 2013], <http://www.dell.com/downloads/global/power/ps4q05-20050175-Kouletsis.pdf>, pp. 98-101.*

Coupaye, Thierry, and Jacky Estublier, Foundations of enterprise software deployment, [Online] Proceedings of the Fourth European Software Maintenance and Reengineering, 2000, [Retrieved from the Internet] <http://ieeexplore.ieee.org/stamp/stamp.jsp?tp=&arnumber=827313> 9 pages.*

Callahan, John R., Software Packaging, [Online] Oct. 15, 1998 University of Maryland Computer Science Department, [Retrieved from the Internet] <http://hdl.handle.net/1903/587 > 100 pages.*

Hellerstein, J.L., Optimizing software packages for application management, [Online] Network Operations and Management Symposium, 2008, [Retrieved from the Internet] <http://ieeexplore.ieee.org/stamp/stamp.jsp?tp=&arnumber=4575110> 8 pages.*

* cited by examiner

FIG. 1

```
<update>
    <version>
        <versionName>1.2.0</versionName>                                    ~202
        <problem>
            <id>custom12rerunProblem</id>                                   ~204
            <action>rerun-custom</action>                                   ~206
            <description translatedKey="true">%rerunCustom120</description> ~208
            <dataMap>
                <dataMapEntry>                                              ~210₁
                    <key>PRE_UPGRADE_MESSAGE</key>                          ~212₁
                    <value translatedKey="true">%custom12rerunProblem_preUpgradeMessage</value>   ~214₁
                </dataMapEntry>
                <dataMapEntry>                                              ~210₂
                    <key>POST_UPGRADE_MESSAGE</key>                         ~212₂
                    <value translatedKey="true">%custom12rerunProblem_postUpgradeMessage</value>  ~214₂
                </dataMapEntry>
            </dataMap>
        </problem>
    </version>
    ...
</update>
```

GUIDED PROBLEM RESOLUTION IN DEPLOYING AN APPLICATION

BACKGROUND

Independent Software Vendors (ISVs) often package applications for deployment onto an application server. The ISVs may provide the packaged applications to one or more customers of the ISVs. The customers of the ISVs may then deploy the packaged application onto the application server. At least in some cases, as the customers upgrade to newer versions of the application server, the customers may deploy the packaged application onto the newer versions of the application server, without requiring the ISVs to re-package the application for deployment.

SUMMARY

Embodiments of the invention provide a computer-implemented method, computer program product, and system for performing an operation that includes packaging an application by a packaging tool for deployment onto an application server, to generate a packaged application. The operation also includes determining that an error exists in the packaged application. The operation also includes issuing a user instruction to update the packaging tool. The operation also includes issuing a user instruction to use the updated packaging tool to repackage the application for deployment onto the application server, to generate a repackaged application, whereby the error does not exist in the repackaged application.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for deploying an application. One embodiment of the invention provides a packaging tool configured to package the application for deployment onto an application server. A provider of the packaging tool, such as an administrative user or developer, may subsequently determine that the packaged application contains an error that prevents the packaged application from deploying correctly to the application server. The tool provider may also determine that in order for the application to deploy correctly onto the application server, the application is to be repackaged using an updated version of the packaging tool. The tool provider may provide a problem definition to the packaging tool via an update service for the packaging tool.

In one embodiment, upon determining that the problem definition applies to the current version of the packaging tool, the packaging tool guides a user (such as an independent software vendor) in updating the packaging tool and/or using the updated packaging tool to repackage the application for deployment onto the application server. To this end, the packaging tool may guide the user via one or more notifications as defined by the problem definition provided by the tool provider. The notifications may specify a sequence of actions for fixing the error, such as first updating the packaging tool and subsequently repackaging the application using the updated packaging tool. Accordingly, the repackaged application may correctly deploy onto the application server. At least in some cases, incorporating the notifications into the packaging tool provides a more convenient and/or reliable mechanism for fixing the error in the packaged application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the packaging tool) or related data available in the cloud. For example, the packaging tool could execute on a computing system in the cloud and guide the user in repackaging an application for deployment. In such a case, the packaging tool could generate deployment assets for the application and store the deployment assets at a storage location in the cloud. Doing so allows the deployment assets to be accessed from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
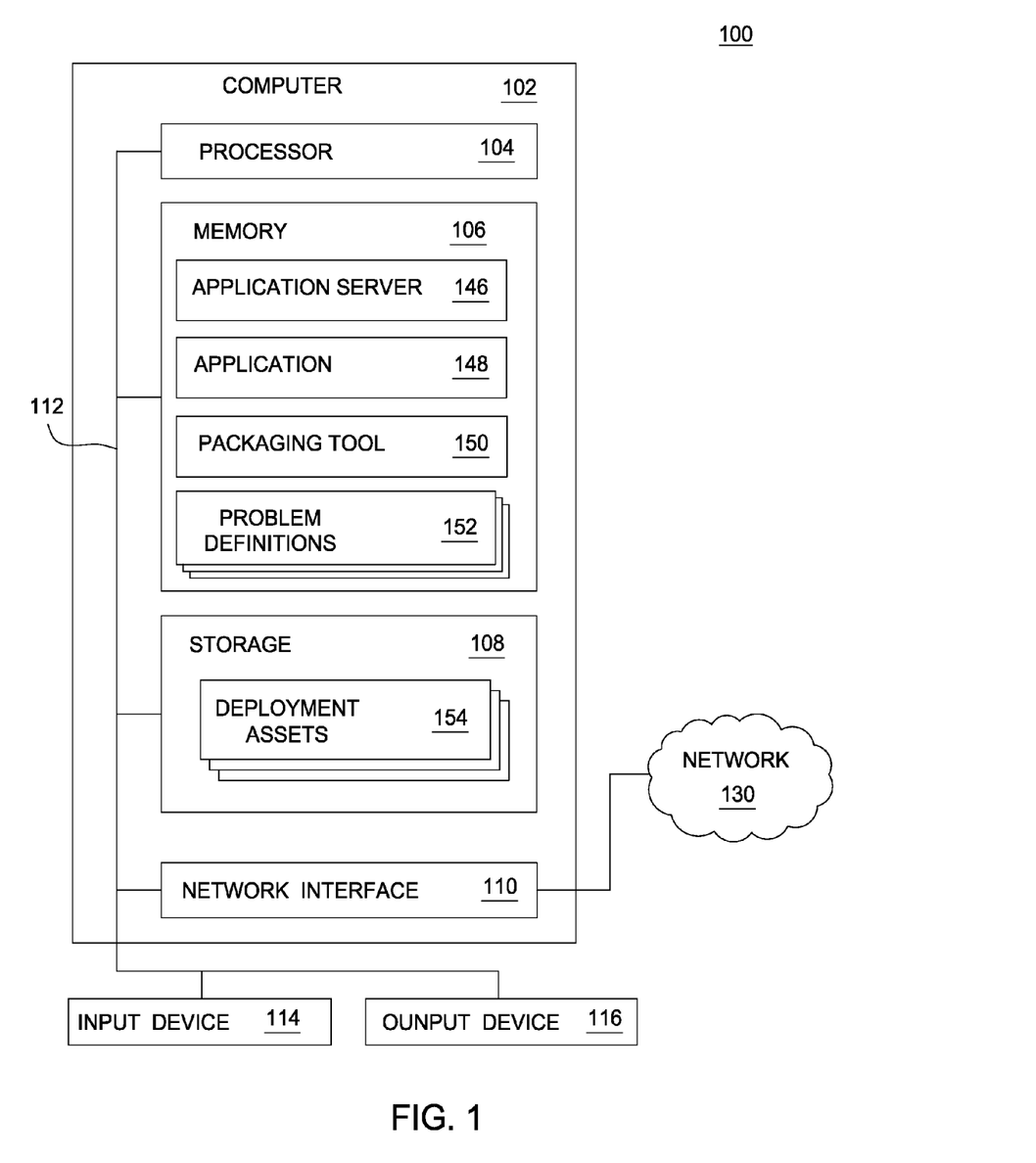
FIG. 1 is a block diagram illustrating a system for deploying an application, according to one embodiment of the invention.

FIG. 1 is a block diagram illustrating a system 100 for deploying an application, according to one embodiment of the invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system.

More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application server 146, an application 148, and a packaging tool 150, which includes one or more problem definitions 152. The storage 108 of the computer 102 includes deployment assets 154 generated for the application 148 by the packaging tool 150. In one embodiment, the application 148 is configured to execute in an environment provided by the application server 146. In an alternative embodiment, the application 148 executes in an environment provided by an operating system (not shown) executing on the computer 102. The application server 146 provides services to the application 148 for security, state maintenance, data access, and persistence, via one or more application programming interfaces (APIs). The application server 146 may be provided as part of a server system, such as the IBM® Smart Cube. In one embodiment, the application server 146 conforms to the Java® Platform, Enterprise Edition (Java EE). As is known, Java EE is a widely used platform for server programming in the Java® programming language. The Java EE-compliant application server 146 may include one or more containers, such as a Servlet container and an Enterprise JavaBeans (EJB) container, and may provide services such as Java Naming and Directory Interface (JNDI), Java Message Service (JMS), and connection pooling.

Further, although embodiments are described herein with reference to the packaging tool 150 and the application server 146 executing on the computer 102, those skilled in the art will appreciate that in alternative embodiments, the packaging tool 150 may execute on a different computer connected to the computer 102 via the network 130. In such cases, the packaged application generated by the packaging tool 150 is transmitted over the network 130 for deployment onto the computer 102.

As described above, in one embodiment, the packaging tool 150 is configured to package the application 148 for deployment onto the application server 146. The packaging tool 150 may package the application 148 based on user input provided to the packaging tool 150. For example, the packaging tool 150 may include a wizard that prompts the user to select which components of the application server 146 are used by the application 148 that is to be deployed. The components used by the application 148 determine what configuration settings are needed to deploy the application 148 onto the application server 146. Deploying an application 148 onto the application server 146 includes one or more of installing the application 148, configuring the application 148 and/or the application server 146, and executing the application 148. Packaging the application 148 includes generating the deployment assets 154 for the application 148. Depending on the embodiment, packaging the application 148 may also include compressing one or more files of application and/or the deployment assets 154 using conventional data compression techniques, such as Lempel-Ziv (LZ) compression. As is known, Lempel-Ziv compression refers to a class of algorithms for lossless data compression. In other embodiments, the packaged application includes the deployment assets 154 and uncompressed files of the application 148.

In one embodiment, the deployment assets 154 specify how to deploy the application 148 for execution on the application server 146 and may include configuration settings for the application 148 and/or the application server 146. Further, depending on the embodiment, the deployment assets 154 may include source code for deploying the application 148, where the source code is generated by the packaging tool 150 and is expressed in a conventional programming language. The source code may retrieve one or more variables from the application 148 and/or the application server 146 for use in deploying the application 148. The source code may install the application 148 onto the computer 102. Further, the source code may configure the application 148 and/or the application server 146 using the configuration settings specified in the deployment assets 154. Once the application server 146 and/or the application 148 are configured, the source code may also launch the application 148 for execution on the computer 102.

From time to time, a user of the packaging tool 150 may upgrade software the application server 146 (or one or more components and/or middleware layers thereof) to a newer version. Assume that the application server 146 includes an enterprise collaboration component. An example of the enterprise collaboration component is IBM® Lotus® Domino®. Assume also that the user of the packaging tool 150 upgrades the enterprise collaboration component to a newer version (e.g., from Domino® 8.0 to Domino® 8.5). Suppose that the newer version of the enterprise collaboration component requires additional information to be collected in creating deployment assets for the application 148, where the packaging tool 150 is not configured to collect the additional information. In other words, the packaged application 148 may not deploy correctly to the upgraded application server, because the information required by the enterprise collaboration component is not found in the deployment assets previously generated for the application 148. To deploy the application 148 correctly onto the upgraded application server, the application 148 is to be repackaged using an updated version of the packaging tool 150. Accordingly, in one embodiment, the provider of the packaging tool 150 configures the packaging tool 150 to guide the user of the packaging tool 150 in fixing the errors.

As described above, in one embodiment, the developer of the packaging tool 150 may subsequently determine that the packaged application contains an error that prevents the packaged application from deploying correctly to the application server 146. For example, the error may be that the (upgraded) application server 146—or an upgraded component thereof—requires information that the packaging tool 150 is not configured to collect when packaging the application 148 for deployment. The information may include any property associated with the application 148, the application server 146, and/or the operating system. In one embodiment, the developer may also determine that in order for the application 148 to deploy correctly onto the application server 146, the application 148 is to be repackaged using an updated version of the packaging tool 150. To this end, the developer may provide the problem definition 152 to the packaging tool 150. The problem definition 152 may be provided to the packaging tool over the network 130 via an update service. In this regard, the update service may be any application that is configured to provide problem definitions to the packaging tool over the network 130. In one embodiment, the update service pushes the problem definition 152 to the packaging tool 150 via an interrupt mechanism, when the problem definition 152 is available. In an alternative embodiment, the packaging tool 150 pulls the problem definition 152 from the update service by periodically polling the update service for problem definitions, based on a predefined schedule set by the developer of the packaging tool 150.

In one embodiment, upon determining that the problem definition 152 applies to the current version of the packaging tool 150, the packaging tool 150 guides the user in updating the packaging tool 150 and subsequently using the updated packaging tool to repackage the application 148 for deployment onto the application server 146. The updated packaging tool may then guide the user via one or more notifications that are displayed to the user. In one embodiment, each notification is defined in the problem definition 152 and includes: (i) a message to be output to the user and (ii) a condition under which the message is output to the user.

As described above, the packaging tool 150 guides the user in updating the packaging tool 150 prior to using the updated packaging tool to repackage the application 148 for deployment. Updating the packaging tool includes: (i) receiving request from a user, via the packaging tool or via a different application, to update the packaging tool and (ii) updating one or more application files of the packaging tool, where the version number of the packaging tool is changed to reflect a newer version of the packaging tool. The version number of the packaging tool may include a sequence of integers, separated by a delimiter such as a period. The version number may also include an alphanumeric string specifying a release type (e.g., alpha, beta, release candidate), etc. The sequence of integers may be in an order representing a decreasing or increasing significance of change between versions. Further, the sequence of integers may include a major number, a minor number, a maintenance number, a build number, and/or a revision number, etc. For example, a version number of "4.1.3.9b" specifies a beta release having a major number of four, a minor number of one, a maintenance number of 3, and a build number of 9. The version number is considered to be changed when at least one of the integers or alphanumeric string is changed. Furthermore, as used herein, the packaging tool is not considered to be updated unless changes to one or more application files of the packaging tool are also accompanied with a change to the version number of the packaging tool.

Figure 2:
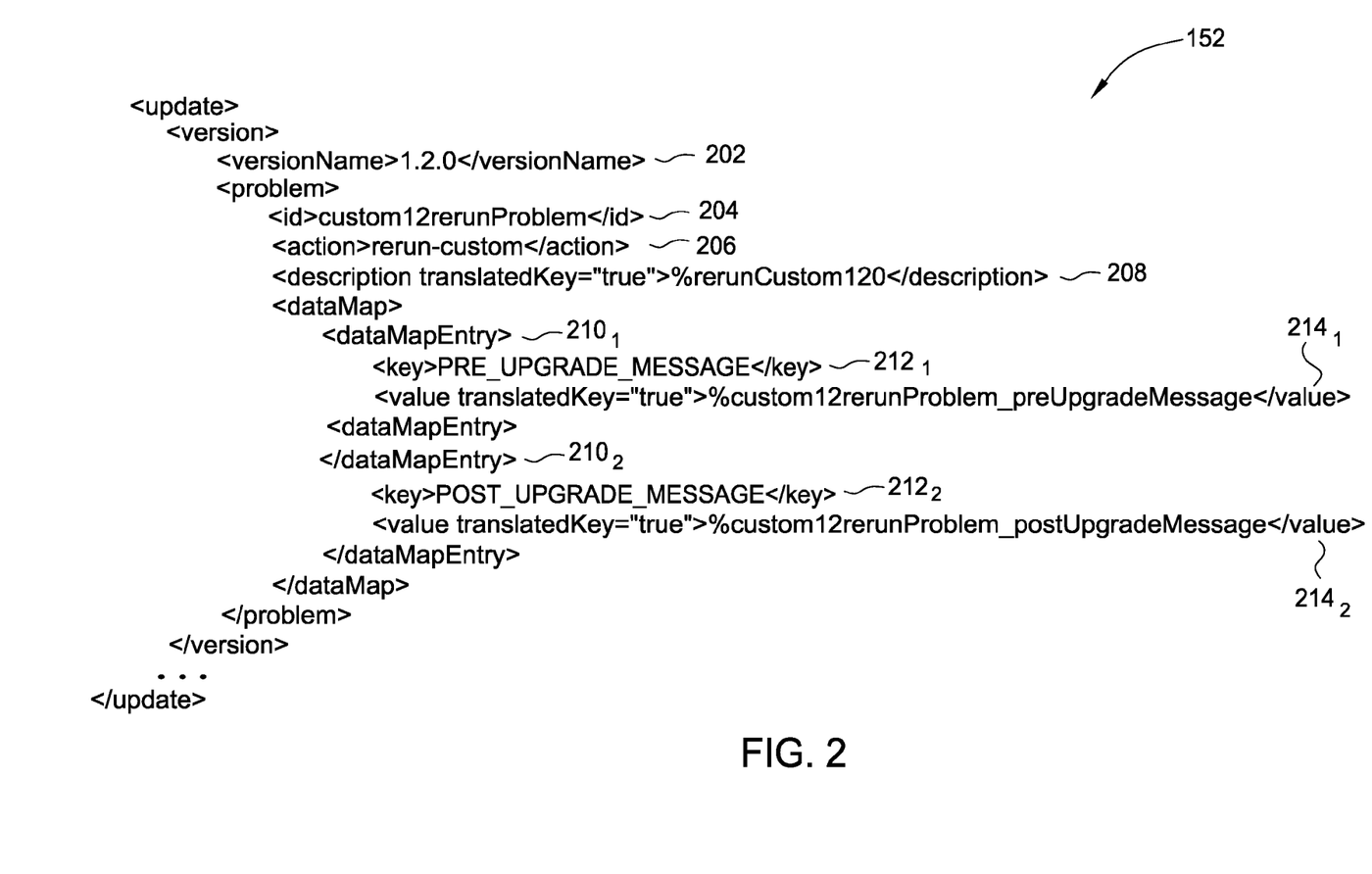
FIG. 2 illustrates a problem definition, according to one embodiment of the invention.

FIG. 2 illustrates an exemplary problem definition 152 of FIG. 1, according to one embodiment of the invention. The problem definition 152 may be in a variety of different formats, such as the Extensible Markup Language (XML) format shown. The problem definition 152 includes a version entry 202 that identifies a version of the packaging tool 150 that the problem definition 152 applies to. The problem definition 152 also includes a problem identifier 204 that specifies a name for an error, an action identifier 206 that specifies a name of an action to be taken to fix the error, and a description 208 of the error. The problem definition 152 also includes one or more notification entries 210.

In one embodiment, each notification entry 210 includes a message identifier 212 and a message value 214. In some embodiments, each notification entry 210 also includes a condition entry that specifies a condition under which a notification of the respective notification entry 210 is output to a user of the packaging tool 150. In alternative embodiments, the condition is specified by the message identifier 212 as shown. For example, the message identifier $212_1$ represents a condition of "prior to updating the packaging tool to version 1.2.0", while the message identifier $212_2$ represents a condition of "subsequent to updating the packaging tool to version 1.2.0". By specifying the various entries of the problem definition 152, the developer of the packaging tool 150 may configure the packaging tool 150 with notifications suited for guiding the user of the packaging tool 150 to fix the error in the packaged application.

Figure 3A:
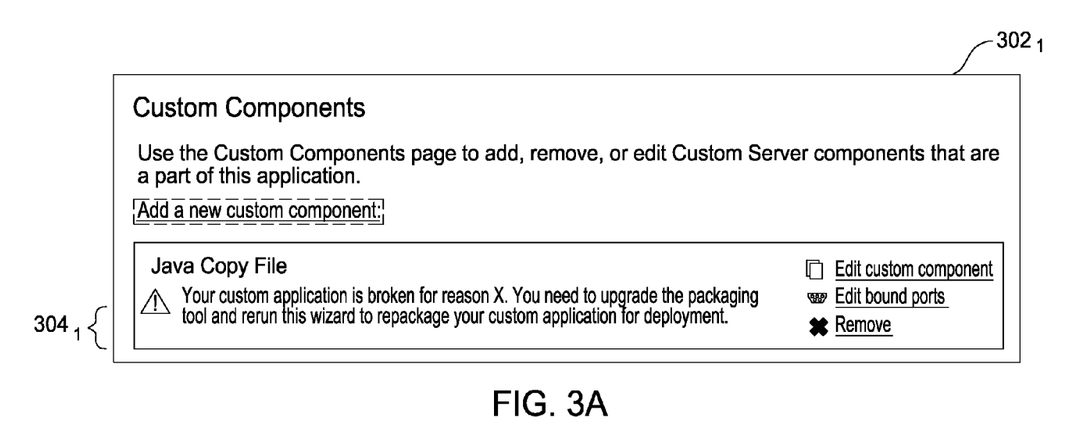
FIGS. 3A-3B illustrate graphical user interface (GUI) screens of a packaging tool, according to one embodiment of the invention.
Figure 3B:
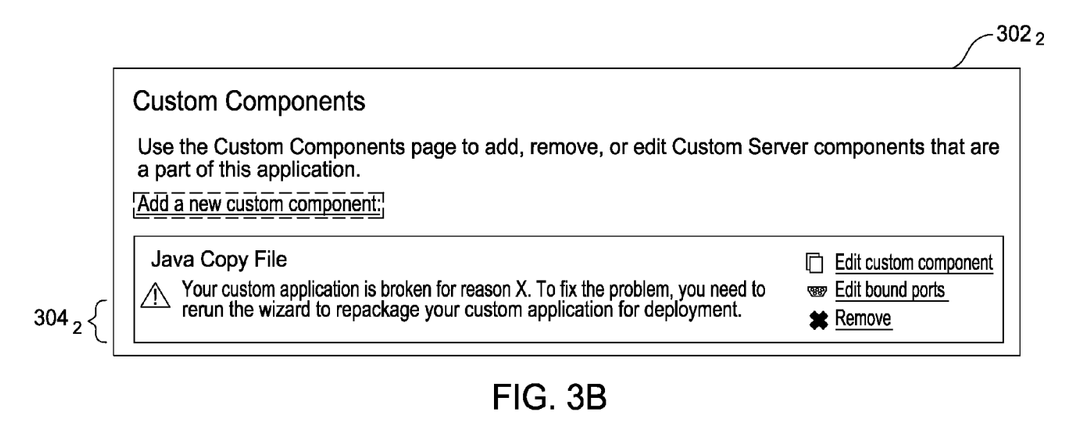

FIGS. 3A-3B illustrate graphical user interface (GUI) screens 302 of the packaging tool 150, according to one embodiment of the invention. In this particular example, the user of the packaging tool 150 may specify, via the GUI screens 302, one or more components of the application server 146 that are included in the application to be deployed. Each GUI screen 302 includes an exemplary notification 304 output by the packaging tool 150 for display to a user of the packaging tool 150. As described above, the developer of the packaging tool 150 may identify an error in the packaged application. Specifically, the developer of the packaging tool 150 may determine that in order for the application 148 to deploy correctly onto the application server 146, the application 148 is to be repackaged using an updated version of the packaging tool 150. For example, assume that the updated version of the packaging tool is configured to expose an additional variable of the application server 146 for use in deploying the application 148, such that the application 148 may be deployed correctly. In other words, repackaging the application using an older version of the packaging tool may not necessarily fix the error, because the older version of the packaging tool is not configured to expose the additional variable of the application server 146, that is used in deploying the application 148.

In one embodiment, to guide the user to fix the error in the packaged application, the packaging tool 150 outputs a first notification $304_1$ to guide the user to update the packaging tool 150 to a newer version. The first notification $304_1$ is output only when the packaging tool 150 determines that the update to the newer version has not taken place. Put another way, a situation may arise where the user updates the packaging tool 150 to the newer version for reasons not relating to fixing the error (e.g., prior to the error being identified by the developer of the packaging tool 150). In this situation, the packaging tool 150 identifies that the user has already performed one of the actions for fixing the error and accordingly refrains from notifying the user to perform the action. In other situations when the first notification $304_1$ is displayed, the first notification $304_1$ may also indicate to the user that the user is to repackage the application 148 using the packaging tool 150, subsequent to updating the packaging tool 150.

In one embodiment, the packaging tool 150 also outputs a second notification $304_2$ to guide the user to repackage the application 148 using the updated packaging tool 150. The second notification $304_2$ is output only when the packaging tool 150 determines that the update to the newer version has already taken place. Because the update has already taken place, the second notification $304_2$ does not indicate to the user that any update to the packaging tool 150 is needed. Accordingly, the packaging tool 150 outputs the first notification $304_1$ and/or the second notification $304_2$ in accordance with the problem definition 152, to guide the user to fix the error in the packaged application.

In one embodiment, the packaging tool 150 may also disable predefined functionality of the packaging tool 150 until the packaging tool 150 is updated, thereby rendering the predefined functionality unavailable to the user until the user updates the packaging tool 150. For example, assume that the packaging tool 150 provides: (i) functionality for packaging the application 148 and (ii) functionality for deploying the packaged application to the application server 146. In one embodiment, the packaging tool 150 may disable only the functionality for deploying the packaged application to the application server 146. Accordingly, the packaging tool 150 may provide incentives for the user to update the packaging tool 150 sooner in order to re-enable the disabled functionality of the packaging tool 150.

Figure 4:
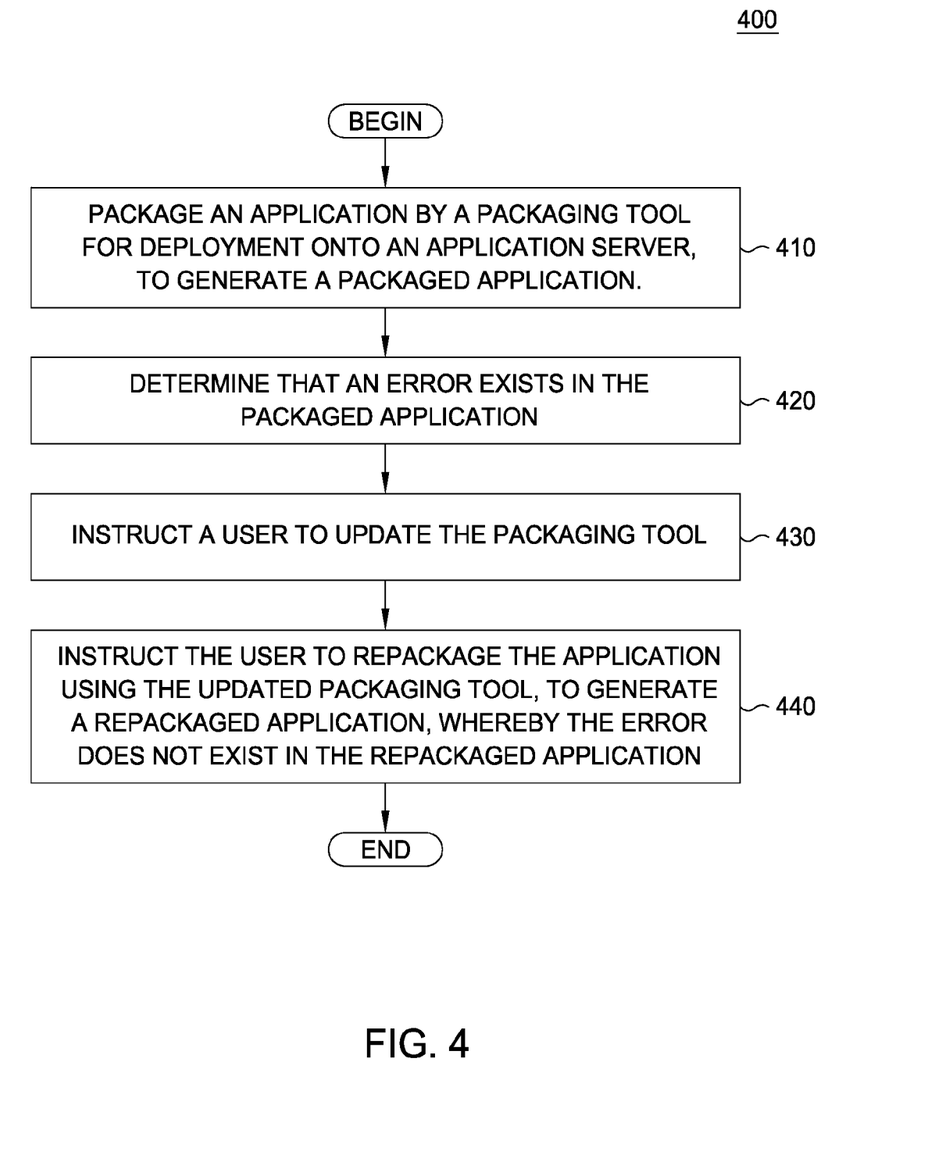
FIG. 4 is a flowchart depicting a method for guiding a user in fixing an error in the packaged application, according to one embodiment of the invention.

FIG. 4 is a flowchart depicting a method 400 for guiding a user in fixing an error in the packaged application, according to one embodiment of the invention. As shown, the method 400 begins at step 410, where the packaging tool 150 packages the application 148 for deployment onto the application server 146, to generate the packaged application. For example, the packaged application may include: (i) a first generated set of deployment assets for the application and (ii) one or more compressed files of the application. At step 420, the packaging tool 150 determines that an error exists in the packaged application. This determination may be made based on one or more problem definitions 152 retrieved from an update service for the packaging tool 150.

At step 430, the packaging tool 150 instructs the user to update the packaging tool 150. For example, the packaging tool 150 may output the notification $304_1$ of FIG. 3A. At step 440, the updated packaging tool instructs the user to repackage the application 148 using the updated packaging tool, to regenerate a repackaged application, whereby the error does not exist in the repackaged application. For example, the packaging tool 150 may output the notification $304_2$ of FIG. 3B. The repackaged application may include: (ii) a second generated set of deployment assets for the application, of which at least one deployment asset differs from the first generated set of deployment assets and (ii) the one or more compressed files of the application. After the step 440, the method 400 terminates.

Advantageously, embodiments of the invention provide techniques for deploying an application. One embodiment of the invention provides a packaging tool. The packaging tool may determine that an error exists in a packaged application, based on a problem definition retrieved from an update service for the packaging tool. The packaging tool may guide a user in fixing the error by updating the packaging tool and repackaging the application using the updated packaging tool. The packaging tool may guide the user via one or more notifications output for display to the user. The notifications may be specified in the problem definition. Advantageously, the user is guided in fixing the error without requiring involvement by any administrative user of the packaging tool, apart from providing the problem definition via the update service. Incorporating the notifications into the packaging tool using the techniques disclosed herein may provide a more convenient and/or reliable mechanism for fixing the error in the packaged application.

While the foregoing is directed to embodiments of the present invention, other and further embodiments of the invention may be devised without departing from the basic scope thereof, and the scope thereof is determined by the claims that follow.

What is claimed is:

1. A computer-implemented method to facilitate error resolution in application deployment, the method comprising:
    packaging an application by a packaging tool for deployment onto an application server, to generate a packaged application;
    retrieving one or more problem definitions by the packaging tool;
    determining that an error exists in the packaged application by operation of one or more computer processors and based on the one or more problem definitions, wherein the error prevents the packaged application from deploying correctly onto the application server; and
    upon determining that the error exists in the packaged application and that the packaging tool is not configured to resolve the error unless the packaging tool is first updated, issuing, based on the one or more problem definitions, user instructions for a first user to resolve the error without requiring intervention from any other user, the instructions specifying how to:
        update the packaging tool; and
        using the updated packaging tool, repackage the application for deployment onto the application server, in order to generate a repackaged application, wherein the error is resolved in the repackaged application.

2. The computer-implemented method of claim 1, wherein the problem definitions are retrieved from an update service operatively connected to the packaging tool.

3. The computer-implemented method of claim 2, wherein packaging the application for deployment comprises generating a first set of deployment assets for the application.

4. The computer-implemented method of claim 3, wherein repackaging the application for deployment onto the application server comprises:
    generating a second set of deployment assets for the application, wherein the second set of deployment assets is different from the first set of deployment assets.

5. The computer-implemented method of claim 4, further comprising:
    disabling predefined functionality of the packaging tool until the packaging tool is updated.

6. A computer-readable memory to facilitate error resolution in application deployment, the memory containing a program which, when executed, performs an operation comprising:
    packaging an application by a packaging tool for deployment onto an application server, to generate a packaged application;
    retrieving one or more problem definitions by the packaging tool;
    determining that an error exists in the packaged application and based on the one or more problem definitions, wherein the error prevents the packaged application from deploying correctly onto the application server; and upon determining that the error exists in the packaged application and that the packaging tool is not configured to resolve the error unless the packaging tool is first updated, issuing, based on the one or more problem definitions, instructions for a first user to resolve the error without requiring intervention from any other user, the instructions specifying how to:
update the packaging tool; and
using the updated packaging tool, repackage the application for deployment onto the application server, in order to generate a repackaged application, wherein the error is resolved in the repackaged application.

7. The computer-readable memory of claim 6, wherein the problem definitions are retrieved from an update service operatively connected to the packaging tool.

8. The computer-readable memory of claim 7, wherein packaging the application for deployment comprises generating a first set of deployment assets for the application.

9. The computer-readable memory of claim 8, wherein repackaging the application for deployment onto the application server comprises:
generating a second set of deployment assets for the application, wherein the second set of deployment assets is different from the first set of deployment assets.

10. The computer-readable memory of claim 9, wherein the operation further comprises:
disabling predefined functionality of the packaging tool until the packaging tool is updated.

11. A system to facilitate error resolution in application deployment, the system comprising:
one or more computer processors; and
a memory containing a program, which when executed by the one or more computer processors is configured to perform an operation comprising;
packaging an application by a packaging tool for deployment onto an application server, to generate a packaged application;
retrieving one or more problem definitions by the packaging tool;
determining that an error exists in the packaged application and based on the one or more problem definitions, wherein the error prevents the packaged application from deploying correctly onto the application server; and
upon determining that the error exists in the packaged application and that the packaging tool is not configured to resolve the error unless the packaging tool is first updated, issuing, based on the one or more problem definitions, instructions for a first user to resolve the error without requiring intervention from any other user, the instructions specifying how to:
update the packaging tool; and
using the updated packaging tool, repackage the application for deployment onto the application server, in order to generate a repackaged application, wherein the error is resolved in the repackaged application.

12. The system of claim 11, wherein the problem definitions are retrieved from an update service operatively connected to the packaging tool.

13. The system of claim 12, wherein packaging the application for deployment comprises generating a first set of deployment assets for the application.

14. The system of claim 13, wherein repackaging the application for deployment onto the application server comprises generating a second set of deployment assets for the application, wherein the second set of deployment assets is different from the first set of deployment assets, wherein the operation further comprises:
disabling predefined functionality of the packaging tool until the packaging tool is updated.

15. The system of claim 14, wherein the repackaged application is correctly deployed onto the application server, wherein the updated packaging tool is, in a first instance, configured to expose an additional variable of the application server, that is required for the application to deploy correctly onto the application server, wherein the packaging tool, in the first instance and prior to being updated, is not configured to expose the additional variable of the application server.

16. The system of claim 15, wherein the updated packaging tool is, in a second instance, configured to collect an additional information element used in generating deployment assets and that is required for the application to deploy correctly onto the application server, wherein the packaging tool, in the second instance and prior to being updated, is not configured to collect the additional information element used in generating deployment assets.

17. The system of claim 16, wherein the disabled predefined functionality comprises functionality for deploying the application, wherein functionality for packaging the application remains enabled regardless of whether the packaging tool is updated, wherein the disabled predefined functionality is re-enabled upon determining that the packaging tool is updated, thereby incentivizing the first user to update the packaging tool.

18. The system of claim 17, wherein upon determining that the error exists in the packaged application and that the packaging tool is configured to resolve the error without requiring the packaging tool to be updated, no instructions are issued to any user, wherein the operation further comprises:
determining a set of components required to deploy the application onto the application server; and
configuring the repackaged application using one or more configuration settings specified in the second set of deployment assets.

19. The system of claim 18, wherein the packaging tool is configured to independently retrieve the one or more problem definitions from the update service via each individual mechanism selected from a predefined polling mechanism and a predefined interrupt mechanism.

20. The system of claim 19, wherein the instructions are specified in the one or more problem definitions, wherein the one or more problem definitions are provided at least in part based on input from an administrative user of the packaging tool, wherein updating the packaging tool comprises:
receiving, from the first user, a request to update the packaging tool;
responsive to the request, updating at least one application file of the packaging tool; and
updating a version property of the packaging tool.

\* \* \* \* \*